United States Patent
Poplack

(10) Patent No.: US 10,073,795 B1
(45) Date of Patent: Sep. 11, 2018

(54) DATA COMPRESSION ENGINE FOR I/O PROCESSING SUBSYSTEM

(71) Applicant: Cadence Design Systems, Inc., San Jose, CA (US)

(72) Inventor: Mitchell Grant Poplack, San Jose, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 230 days.

(21) Appl. No.: 14/864,335

(22) Filed: Sep. 24, 2015

(51) Int. Cl.
| | |
|---|---|
| *G06F 13/12* | (2006.01) |
| *G06F 13/16* | (2006.01) |
| *G06F 5/06* | (2006.01) |
| *G06F 12/0862* | (2016.01) |
| *G06F 9/30* | (2018.01) |
| *G06F 13/10* | (2006.01) |

(52) U.S. Cl.
CPC .......... *G06F 13/1673* (2013.01); *G06F 5/065* (2013.01); *G06F 9/30047* (2013.01); *G06F 12/0862* (2013.01); *G06F 13/105* (2013.01); *G06F 13/1642* (2013.01); *G06F 2205/067* (2013.01); *G06F 2212/6028* (2013.01)

(58) Field of Classification Search
CPC . G06F 11/261; G06F 17/5022; G06F 17/5027
USPC .......................................... 710/316; 716/106
See application file for complete search history.

(56) References Cited

U.S. PATENT DOCUMENTS

| | | | |
|---|---|---|---|
| 6,530,065 B1* | 3/2003 | McDonald | G06F 17/5036 716/102 |
| 6,618,788 B1* | 9/2003 | Jacobs | G06F 13/385 710/22 |
| 6,810,442 B1* | 10/2004 | Lin | G06F 17/5022 703/27 |
| 8,504,345 B1* | 8/2013 | Tsuk | G06F 17/5045 703/13 |
| 8,739,090 B1 | 5/2014 | Gao et al. | |
| 2005/0229061 A1* | 10/2005 | Kang | G06F 11/263 714/738 |
| 2014/0164856 A1* | 6/2014 | Damodaran | G11C 29/16 714/718 |
| 2015/0012507 A1* | 1/2015 | Fallon | H04N 9/8042 707/693 |

* cited by examiner

*Primary Examiner* — Titus Wong
(74) *Attorney, Agent, or Firm* — Hunton Andrews Kurth LLP

(57) ABSTRACT

In a system and method for emulating a circuit design, an emulation system receives input instructions from a host device executing the emulation and returns test results and trace data. Channels of multiple buffers and associated processors implement the test operations. Compression units on each channel may compress the test and trace data to facilitate returning the results to the host device. Multiple channels may be used to compress data in parallel, thereby improving throughput.

20 Claims, 6 Drawing Sheets

100

DATA COMPRESSION ENGINE FOR I/O PROCESSING SUBSYSTEM

BACKGROUND

Aspects of the present invention relate generally to the field of circuit design and test, and more specifically to compression of data in emulation systems for functional verification of circuit designs.

Integrated circuit (IC) design is increasingly complex, sometimes involving millions of elements, shapes or geometries. An electronic design automation (EDA) tool may facilitate the design by allowing a designer to interactively position ("place") and connect ("route") various shapes on the circuit. The EDA tool then creates a circuit layout containing the physical locations and dimensions of the circuit's components, interconnections, and various layers from the original design that may then be fabricated, creating the IC. The designed IC is eventually fabricated by transferring or printing the circuit layout to a semiconductor substrate in a series of layers that collectively will form the features that constitute the devices that make up the components of the integrated circuit.

After or during the design and creation of an IC layout, validation, optimization, and verification operations are performed on the layout using a set of testing, simulation, analysis and validation tools. For example, hardware designers may employ a hardware based verification platform to perform certain testing operations. Hardware verification platforms can enable testing of the various components of the design, which facilitates design analysis and debugging. Multiple aspects of the hardware design typically may be tested. For example, a hardware design may undergo architectural simulation and analysis and debugging where the functionality of each of the components being implemented in the design is tested, for example, with transaction level modeling (TLM) or bus functional modeling. The hardware design may additionally undergo circuit simulation and analysis where the signals between components are tested, for example using register transition level (RTL) analysis.

Other steps may include system simulation, for example to model the components of a system together, and system and software emulation, for example to model execution of the hardware and software elements executing on a modeled system. A common method of design verification is to use hardware emulators to emulate the circuit design prior to physically manufacturing the integrated circuit. Hardware functional verification systems typically utilize arrays of processing devices or programmable logic devices, and to verify circuit designs. Processor-based emulators sequentially evaluate the design under verification, starting at the inputs and proceeding to the outputs, allowing engineers and hardware designers to test and verify the operation of an integrated circuit, an entire board of integrated circuits, or an entire system without having to first physically fabricate and manufacture the electronic hardware.

Additionally, during execution of the emulation, a large amount of test results such as logic waveforms and other data will be generated. The quantity of data can be so large that the time to transfer the data to a host workstation or to storage can significantly impact the performance perceived by the user.

Accordingly there is a need in the art for an emulation system that provides flexible access to the emulation processes and test logic and further provides for compression of the generated test data.

BRIEF DESCRIPTION OF THE DRAWINGS

The foregoing and other aspects of various embodiments of the present invention will be apparent through examination of the following detailed description in conjunction with the accompanying drawing figures in which similar reference numbers are used to indicate functionally similar elements.

DETAILED DESCRIPTION

Aspects of the present disclosure describe an I/O Processing Subsystem that facilitates connecting one or more host system(s) with multiple chips to emulate a hardware design. The interface may be used for control and data communications between hosts and Application Specific Integrated Circuits (ASICs), including data upload and download, as well as command and control.

Systems and methods are provided for emulating a circuit design coupled to the described I/O Processing System. A host system, such as a personal computer or workstation, may convert a hardware design into a sequence of instructions that can be emulated by the emulation logic and access via the I/O Processing System described herein. According to an embodiment, an emulation system receives input instructions from a host device executing the emulation. Channels of buffers and associated processors are provided as an interface to system memory. The buffers and processors use the instructions to implement various commands. By writing a sequence of commands and/or data blocks to the channel buffers, the associated processors can execute programs of varying complexity that may be written or modified in real time.

During execution of emulation and using the channels provided in the I/O Processing System, test results and other data may be generated. Compression of this data can be used to reduce the total size of the data, easing the burden of uploading the data to the host device. Multiple compression units are provided such that data compression may occur in parallel across multiple compression units. Compression operations may be managed and controlled internally within the I/O Processing System.

Figure 1:
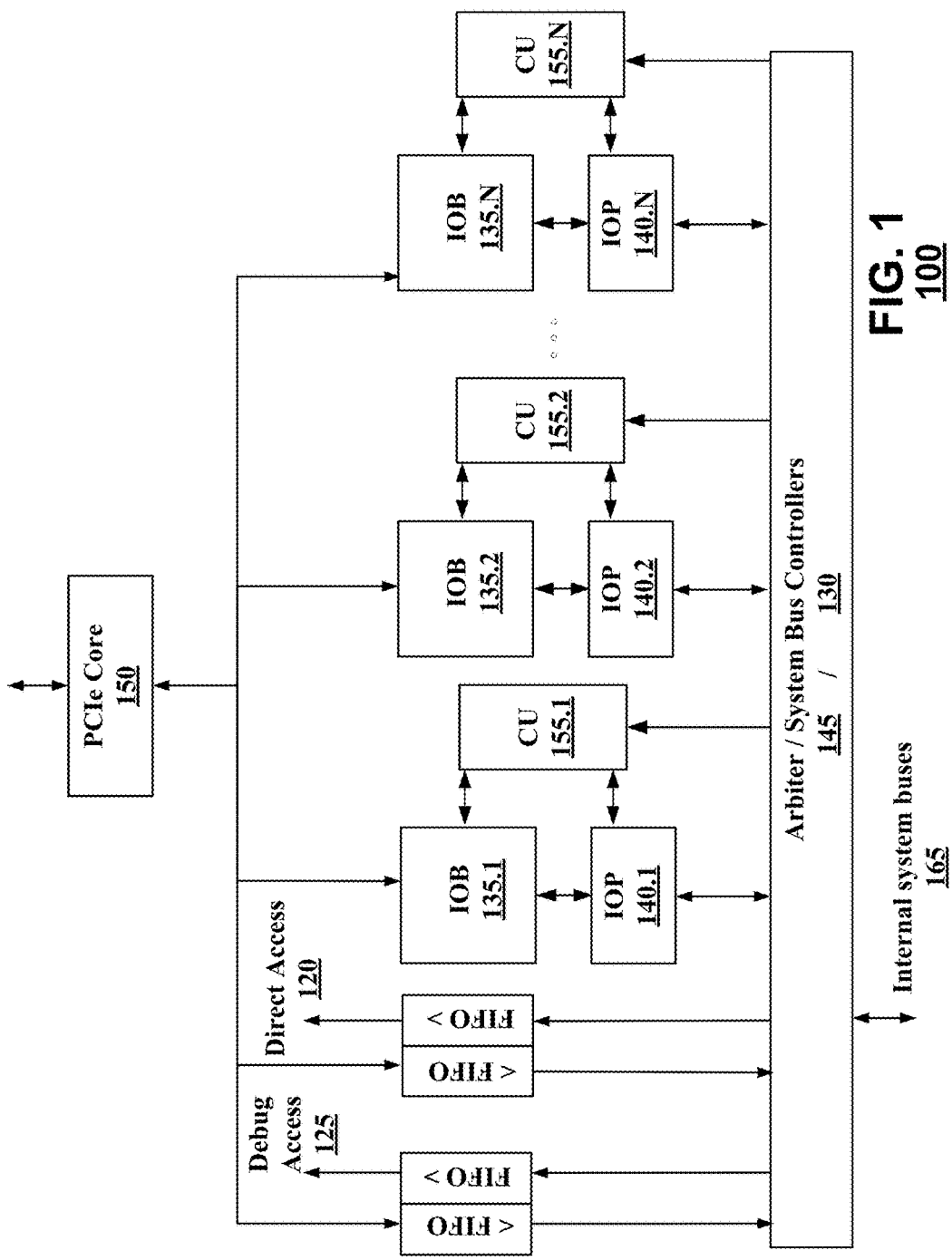
FIG. 1 is a simplified block diagram that illustrates an exemplary I/O processing subsystem according to an embodiment of the present disclosure.

FIG. 1 is a simplified block diagram that illustrates an exemplary I/O processing system 100 according to an embodiment of the present disclosure. The I/O processing system 100 consists of a number of I/O Processors (IOPs) 140 which can run in parallel to interface between a PCIe bus and the Internal System Buses (ISB) 165. As shown in FIG. 1, data may be provided from the PCI interface provided by PCIe Core 150 to system memory accessed via an internal bus system 165 via multiple channels, for multiple sources of data. For example, data may be passed straight through a channel to the bus controller and ultimately to the internal memory space. Alternatively, the data passed into one of the multiple channels may be processed as instructions, may simply be buffered in one of the channel buffers, or may contain instructions that control the data input into other channels. These channels, comprising buffers and processors for handling the data put into the buffers, are described in further detail below.

The system may include direct access FIFO buffers 120 that facilitate PCI direct access to the internal memory space, and debug access FIFO buffers 125 that facilitate PCI debug access to the internal memory space. The system 100 also may include multiple I/O buffers (IOBs) 135.1-135.N that may be used for data and/or I/O programs and multiple I/O processors (IOPs) 140.1-140.N that interpret received commands and route data between buffers and the internal system bus. An IOB can be set to FIFO mode or to buffer mode. Buffer mode may be used when the buffered data contains an I/O program that may be reused or that branches. FIFO mode may be used when the buffered data is simply passing through the buffer, if the buffered data is larger in size, or if the buffered data includes a short linear program, such as a list of short writes. According to an embodiment, there may be one IOP for every IOB.

An IOB can be configured as an input-output FIFO pair or as a buffer memory. According to an aspect of an embodiment, a register, such as an IOP process state register, may indicate the state of the IOB.

When used for data only, the IOB may be accessed by commands generated from another IOP (and PCI command). In this case, the choice of FIFO mode or buffer mode depends on the application being executed via the IOP. When an IOB is in buffer mode to execute IOP programs, this looks and acts like a common single-memory CPU architecture where the IOP can execute programs and access data from the memory.

When an IOB is in FIFO mode, the associated IOP looks like a list processor, as it only acts on the tail of the input FIFO. For example, the IOP still has access to its entire instruction set and registers, programs can still contain commands and data, variables and other data are available, and blocks of data can still be embedded in the sequence. However, any references to the IOB can only access the tail of the input FIFO. Specifically, blocks of data embedded in the sequence must follow the instruction which references them. Random access to the IOB is not available. Branch and jump instructions are available, but they may only jump in the forward direction, resulting in the specified number of words being dequeued and discarded.

When in FIFO mode an associated IOB may know the fullness state of the buffer, but the IOP also needs to know the amount of expected data so that the IOP can properly initiate unloading of the FIFO. The expected data may be provided in a length field in the header of the received data.

When an IOB is in one mode but is accessed in another mode, any data in the IOB may be flushed to allow the new access. Additionally, the unanticipated mode switch may trigger generation of an error message or other error handling.

The IOPs 140 and associated IOBs 135 provide an interface between the PCI interface provided by the PCIe core 150 and the system memory, and provide programmability for control and data transfers so that the usage needs of the chips and PCI connected devices need not be known at RTL design time. Furthermore, the IOPs 140 provide significant flexibility that provides a mechanism for workarounds and for modifying instructions in real time.

According to an embodiment, the system 100 may include multiple compression units (CUs) 155.1-155.N. There may be one CU 155 associated with each IOB 135. Compression operations may be initiated by an internal compression instruction from an internal system bus controller 130 or arbiter 145, the IOP 140 associated with the respective IOB 135 and CU 155, or by another IOP 140. Each CU may store certain information in a set of extended registers. For example, the extended registers may store busy status information, a compression mask pointer, and/or a compressed data pointer.

The CU 155 may implement a known compression method or algorithm to compress the data. For example, according to an embodiment, the CU 155 may compress data by comparing two blocks of data (e.g., a first block n and a next block n+1) and eliminating any unchanged bytes. Then, one bit may be used to represent each remaining byte in a status byte, and only the bytes in the second block n+1 exhibiting changes from the first block n will be included in the compressed data. After two blocks are compared, e.g., block n and block n+1, the next block, n+2 may be compared to block n+1 and so on. The comparison chain may continue until the compression is reset.

An exemplary compression algorithm is disclosed in U.S. Pat. No. 8,739,090, the disclosure of which is incorporated herein by reference.

Figure 2:
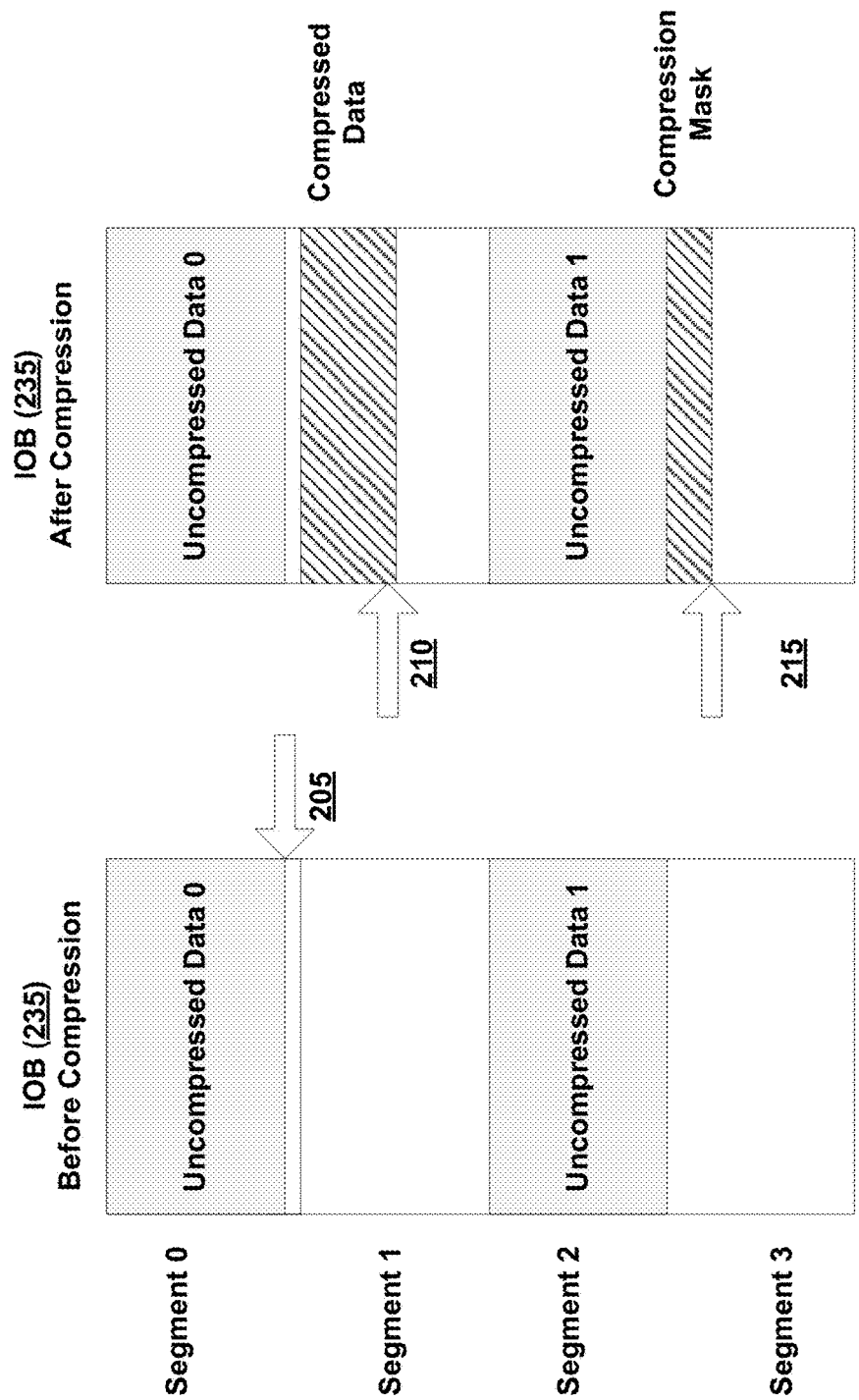
FIG. 2 illustrates an exemplary buffer used during compression according to an embodiment of the present disclosure.

A CU 155 may use the associated IOB 135 to facilitate compression. FIG. 2 illustrates an exemplary IOB 235 used during compression. In FIG. 2, an IOB 235 used by a CU for compression may be divided into four segments (segments 0-3). Uncompressed data may initially be loaded into segments 0 and 2. After compression operations are performed by the CU, the resultant compressed data may be stored in segment 1 and the associated compression mask results in segment 3.

Upon initiation of compression operations, an IOP associated with the IOB 235 may set a parameter 205 that indicates the length of the uncompressed data in the buffer. Once compression is complete, the CU 155 may return to the IOP a parameter 210 that indicates the length of the compressed data and a parameter 215 that indicates the length of the compression mask. The compression mask will consist of all of the one bits used to represent the changed status of each byte in the status byte. According to an embodiment, the compression mask will contain approximately ⅛ data as the uncompressed data.

Newly compressed data is added to the end of the previously compressed data until the data is packaged, for example to be returned to the host device responsive to a read command. The IOP may keep a count of the amount of compressed data stored in the IOB or otherwise compressed since the compression variables were last reset. Compression variables may be reset every time a new compression command is initiated, or a compression sequence may be initiated without resetting the compression variables. The compression variables may need to be reset periodically to avoid a memory segment overflow.

Returning to FIG. 1, according to an embodiment, an exemplary system configuration may include 12 IOPs 140 with corresponding IOBs 135 and CUs 155, a single debug FIFO 125, and a single direct access FIFO 120, for a total of 14 channels. The IOB associated with each IOP may provide 8k×64b of memory where each IOB can be configured as a 4k×64b input FIFO and a 4k×64b output FIFO when in FIFO mode. In buffer mode, each IOB may be configured as an 8k×64b buffer. The CU 155 may operate on units of a bit length that coincides with the minimum unit produced by the I/O processing subsystem. For example, the I/O processing subsystem may operate with words of a minimum 512 bits (eight 64b words). A CU 155 may then operate on any size of input data in multiples of 512 bits up to ¼ the size of an IOB (e.g., 16 kB). CU 155 may additionally perform comparison operations on a byte by byte basis or may be configured to operate on wider data. For example, 16, 32, or 64 bits may be used in the comparison.

According to an embodiment, an IOB operating in buffer mode may perform similarly to a two-ported memory. A first read/write port may be accessed by and controlled by the PCI interface of the PCIe Core 150 and a second read/write port may be accessed and controlled by the ISB 165. Therefore data can be read by the PCI and written by the ISB at the same time or vice versa. Each read/write port may operate on one word (64b) at a time.

According to an embodiment, an IOB operating in FIFO mode may perform similar to two two-ported memories. As previously noted, the IOB can be configured as a 4k×64b input FIFO and a 4k×64b output FIFO when in FIFO mode. Then each FIFO will also contain two read/write ports. A first read/write port of each of the input and output FIFOs may be accessed by and controlled by the PCI interface of the PCIe Core 150 and a second read/write port of each of the input and output FIFOs may be accessed and controlled by the ISB 165. Therefore data can be read by the PCI and written by the ISB at the same time that data is being read by the ISB and written by the PCI. In order to implement this functionality, each IOB will have four ports. Each read/write port may operate on one word (64b) at a time.

When used with a compression unit, the CU 155 may access and control all four ports of the IOB. Then, when performing compression operations, the CU may read two words of uncompressed data at the same time from two read ports of the IOB and will write compressed data to one write port and the compression mask to another write port all at the same time. This provides for accelerated compression.

The host system, accessing the I/O Processing System via the PCI interface, may not be aware of the data channels provided by the IOPs and IOBs, but rather will simply perform memory accesses. The I/O processing function of IOPs may be used to process data and perform the sequenced operations of programs loaded into the system. For example, a particular program can be executed once, as with a list of packaged instruction sent one time by the host; occasionally, as triggered by either a write from the host or from virtual logic; often and regularly, as with certain simulation acceleration lockstep modes; or all the time, as with a program that is put into a loop based on an internal status. Data associated with a program can be placed in a separate IOB as the sequence of instructions or will follow the instructions in the associated IOB.

IOPs may execute a number of different types of program instructions, including, for example: a write instruction which causes the IOP to write data from the associated or other buffer to the system memory space; a read instruction which causes the IOP to read data from the system memory space into a buffer; an initiate download instruction to initiate a PCI download from the PCI host to a buffer; an initiate upload instruction to initiate a PCI upload from a buffer to a PCI host; a synchronization instruction which will cause the IOP to wait for some condition before proceeding; atomic test, set, and modify instructions which operate on a lock; a branch instruction which will cause the IOB to access an addressed buffered command; and a halt instruction to halt processing operations. Synchronization instructions may include conditions denoting waiting for a particular step number, a cycle number, a condition under virtual control via Hardware Control Bits (HCBs), a condition under virtual and system-wide control via Embedded Control Bits (ECBs), a state of another IOP or IOB, or the state of a lock.

Each IOP may have a set of associated registers (not shown). For example, each IOP may have access to 16 64 bit registers which are not accessible by other IOPs in the system. The non-shared register space can be used for temporary storage of variables for complex I/O programs, or for backing up chip registers that need to take on different states between different I/O programs. Each IOP may also have access to a set of shared registers accessible by every IOP. Other registers may also be implemented; for example, each IOP may access a carry out register which updates from ADD and SUB instructions only and contains 0 or 1 depending on whether an arithmetic carry was generated, and an error register which contains bits which signal unintended programming.

Additionally, there may be a memory space (not shown), accessible through the internal system buses 165, which is not reserved for any other chip resource, and is not accessible to virtual logic, but which can be used when an I/O program needs access to more memory, and can be used as shared memory between I/O programs. IOPs may also have access to a set of locks, for example semaphores, which may be used for synchronization between different I/O programs and to lock access to particular chip resources.

An arbiter 145 controls priority of access to the internal system buses 165 and resolves conflicts, whereas the internal system bus controllers 130 control internal buses 165 and serve as the internal direct memory access (DMA) engines.

The internal system bus controllers may signal a CU 155 to begin compression operations on generated or gathered data in preparation for transmission. Alternatively, an IOP may initiate the compression with an internal command.

Figure 3:
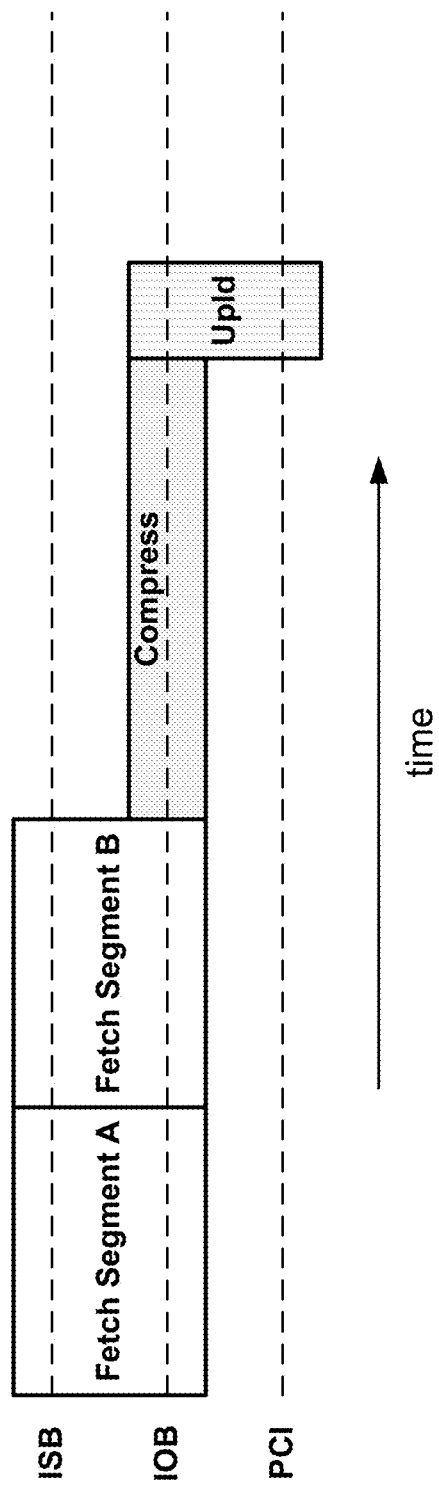
FIG. 3 illustrates an exemplary timing diagram for compressing data according to an embodiment of the present disclosure.

FIG. 3 illustrates an exemplary timing diagram for compressing data according to an embodiment of the present disclosure. In FIG. 3, a single IOB is used to manage compression of the data. Preliminarily, an ISB controller (ISB) will fetch a first segment of data, segment A, and store it in the IOB. Then the ISB will fetch a second segment of data, segment B, and store it in the IOB. The two segments may then be compressed at the IOB (using the associated CU) and then uploaded from the IOB to the PCI interface to return the compressed data to a host device. In an exemplary embodiment, if a segment includes 2k×64b data, then the fetch will take 2k steps, the compression will take 4k steps, and assuming 4× compression, the upload will take 512 steps. Then the system will be capable of returning 16 kB of requested data in approximately 17 µs or at a rate of 7.5 Gbps.

Figure 4:
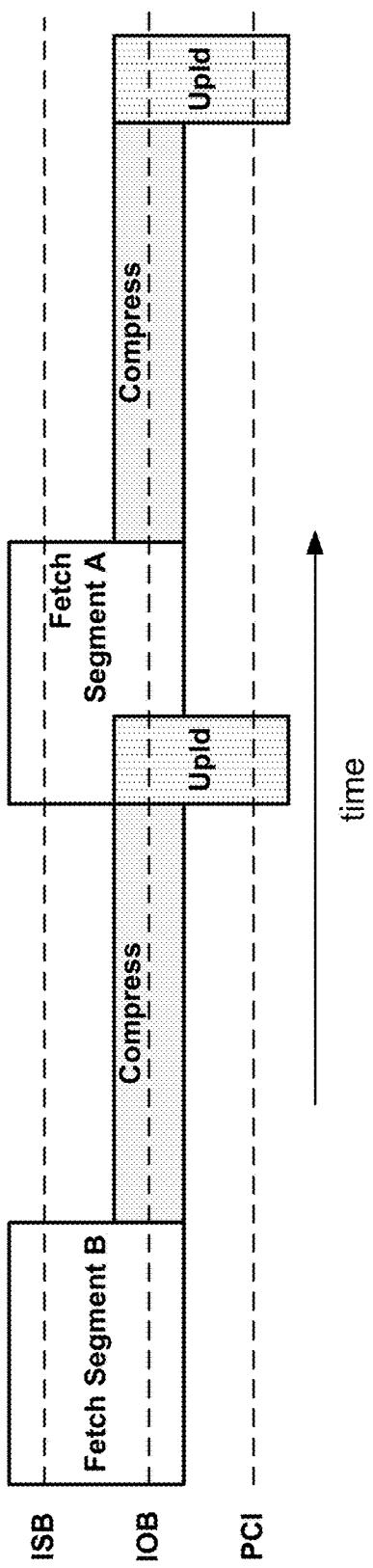
FIG. 4 illustrates an exemplary timing diagram for compressing data according to an embodiment of the present disclosure.

FIG. 4 illustrates an exemplary timing diagram for compressing data according to an embodiment of the present disclosure. In FIG. 4, a single IOB is used to manage compression of the data but the associated IOP will ping-pong between the two segments to accelerate the compression process. For example, operations at the IOB will alternate between fetching into segment A while uploading from segment B and vice versa. Preliminarily, the ISB will fetch a segment of data, segment B, and store it in the IOB. Then the IOB (and the associated CU) will begin compression operations with respect to segment B. During upload of the compressed data to the PCI interface, the ISB may fetch another segment of data, segment A, and store the segment in the IOB. Segment A may then be compressed at the IOB (using the associated CU) and then uploaded from the IOB to the PCI interface to return the compressed data to a host device. In an exemplary embodiment, if a segment includes 2k×64b data, then the fetch will take 2k steps, the compression will take 4k steps, and assuming 4× compression, the upload will take 512 steps. Then the system will be capable of returning 16 kB of requested data in approximately 12 µs or at a rate of 10.7 Gbps.

Figure 5:
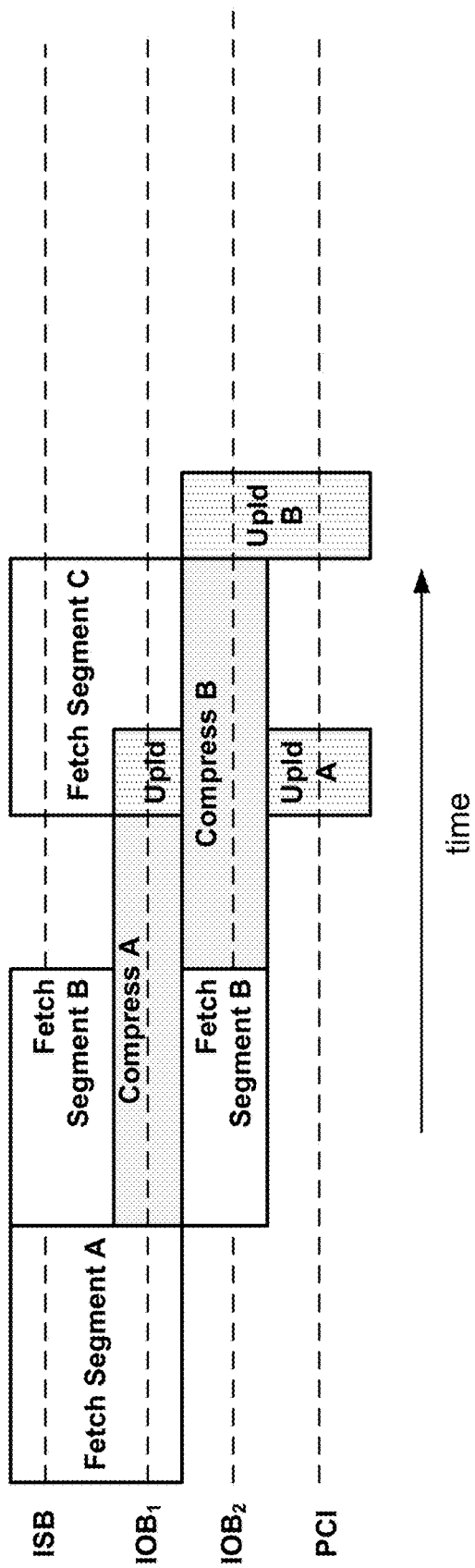
FIG. 5 illustrates an exemplary timing diagram for compressing data according to an embodiment of the present disclosure.

FIG. 5 illustrates an exemplary timing diagram for compressing data according to an embodiment of the present disclosure. In FIG. 5, two IOBs ($IOB_1$ and $IOB_2$) will be used to manage compression of the data. Preliminarily, the ISB will fetch a segment of data, segment A, and store it in $IOB_1$. Then $IOB_1$ (and the associated CU) will begin compression operations with respect to segment A. During compression of segment A, the ISB may fetch another segment of data, segment B, and store the segment in $IOB_2$. Segment B may then be compressed at $IOB_2$ (using the associated CU) and then uploaded from the IOB to the PCI interface to return the compressed data to a host device. Once the compression of segment A is complete, and while the compressed data is being uploaded to the PCI interface, the ISB may fetch a next segment, segment C, and store the segment in $IOB_1$ for compression. The compression of data may continue in this manner until all the necessary data, for example to respond to a read command, has been compressed. In an exemplary embodiment, if a segment includes 2k×64b data, then the fetch operation will take 2k steps, the compression will take 4k steps, and assuming 4× compression, the upload will take 512 steps. Then the system will be capable of returning 32 kB of requested data in approximately 12 µs or at a rate of 21.3 Gbps.

Figure 6:
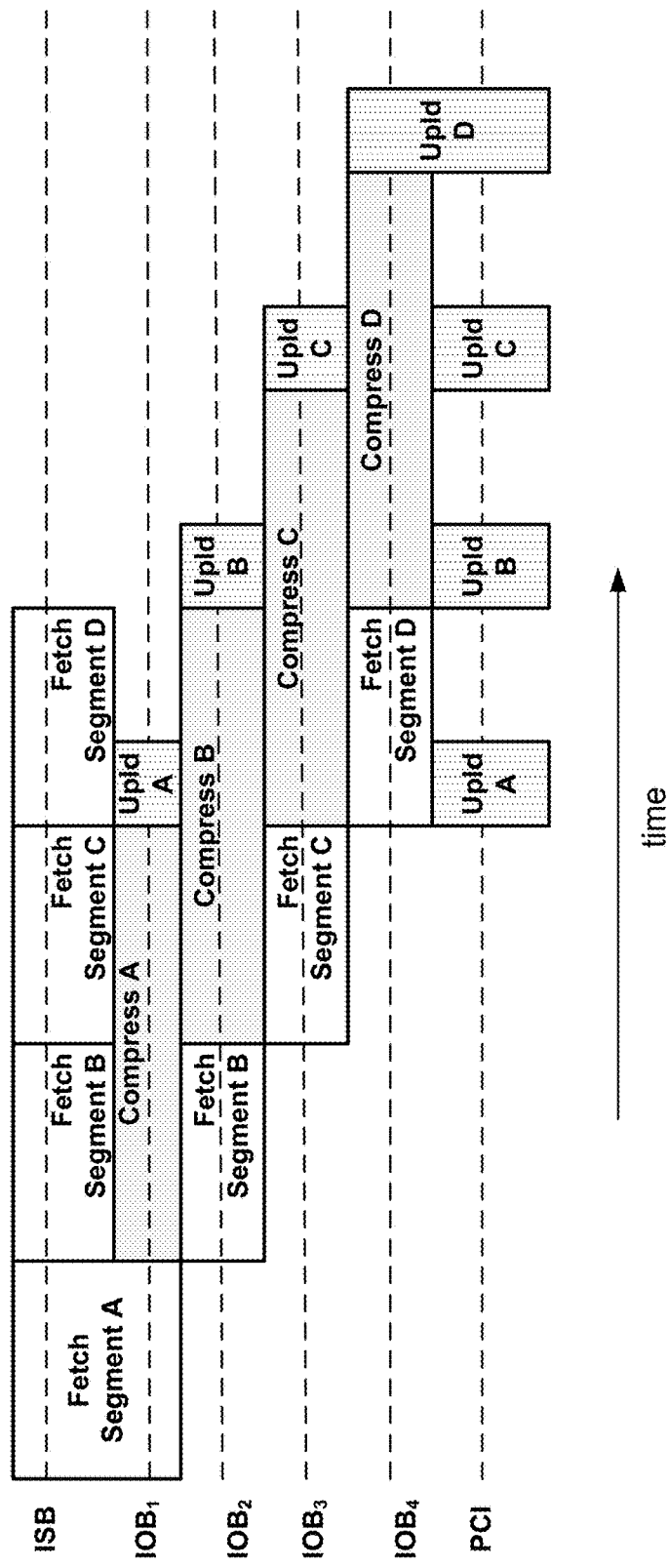
FIG. 6 illustrates an exemplary timing diagram for compressing data according to an embodiment of the present disclosure.

It will be evident that additional IOBs, beyond those shown in FIG. 5, may be used to expedite compression. FIG. 6 illustrates an exemplary timing diagram for compressing data according to an embodiment of the present disclosure. In FIG. 6, four IOBs ($IOB_1$, $IOB_2$, $IOB_3$, and $IOB_4$) are used to manage compression of the data. Preliminarily, the ISB will fetch a segment of data, segment A, and store it in $IOB_1$. Then $IOB_1$ (and the associated CU) will begin compression operations with respect to segment A. After fetching segment A, and during compression of segment A, the ISB may fetch another segment of data, segment B, and store the segment in $IOB_2$. Segment B may then be compressed at $IOB_2$ (using the associated CU). After fetching segment B, and during compression of segment A and segment B, the ISB may fetch a next segment, segment C, and store the segment in $IOB_3$. Segment C may then be compressed at $IOB_3$ (using the associated CU). After fetching segment C, and during compression of segment B and segment C, the ISB may fetch a next segment, segment D, and store the segment in $IOB_4$. Segment D may then be compressed at $IOB_4$ (using the associated CU). Once the compression of each segment is complete, the compressed data will be uploaded to the PCI interface. In an exemplary embodiment, if a segment includes 2k×64b data, then the fetch will take 2k steps, the compression will take 4k steps, and assuming 4× compression, the upload will take 512 steps. Then the system will be capable of returning 64 kB of requested data in approximately 16 µs or at a rate of 32 Gbps.

The IOPs may be configured to allow multiple different types of access to the system memory. The multiple access modes can facilitate receiving different types of messages and provide different methods for accessing internal memory space.

According to an embodiment, a first access mode may provide direct access to the memory resources. In this first access mode, a PCI host interface will command an appropriate IOP based on the PCI header of the incoming data. For example, in the case of a write instruction, the payload data of the incoming data is inserted into an appropriate FIFO or IOB in FIFO mode. As part of the incoming data, the PCI address will direct which FIFO to use for the incoming data and may also identify an ultimate target address in the internal memory space. The direct access mode may be the primary mode of access for most applications, particularly applications that do not require special IOP functionality such as interlocking, programmability, or performance.

Returning to FIG. 1, the direct access FIFOs 120 and debug access FIFOs 125 provide simple access to chip resources in a memory-mapped fashion. The direct and debug FIFOs may be used to access internal memory according to the direct access mode only as the direct access FIFOs 120 and debug access FIFOs 125 do not support instructions and they do not have associated registers. An IOB 135 operating in FIFO mode may provide the same functionality as the direct 120 and debug 125 FIFOs, particularly if there are no direct access FIFOs 120 or debug access FIFOs 125 available.

A second access mode may provide deposit of incoming data into an IOB in FIFO mode without reference to an ultimate target address in system memory. In this FIFO access mode, the PCI host interface logic may not issue any commands, but rather will include address information that may be used to facilitate the selection of a target FIFO buffer.

The FIFO access mode may be used to accelerate access to a large block of data. For example, one large block of data may be packaged as a single transaction rather than multiple little transactions. In this instance, the incoming information may include both commands and data but the ultimate target memory space may be determined by the commands embedded in the data payload.

For example, if an input includes commands embedded with the data in the payload and the addressed target buffer is a buffer in FIFO mode, blocks of data sent to this buffer may contain data to be written to multiple locations in sequence. Then, the IOP may perform a sequence of writes which require, for example, adjustments to modes, byte enables, etc. Or the IOP may perform a sequence of small writes without the inefficiency of multiple initiating transactions.

Additionally, the FIFO access mode may be used to deposit data into a buffer such that the associated IOP may be used strictly for data while another, potentially preprogrammed, IOP will determine when to perform a sequence of accesses on that data. In this instance, the incoming data payload may include only data without any associated embedded commands. Related internal bus transactions, and the ultimate target in memory space, may be determined by the preprogrammed IOP.

In FIFO access mode, a PCI read instruction will cause data to be fetched directly from the FIFO buffer, without any regard for how the data got there. Therefore, for a read instruction in FIFO access mode, the data must have been fetched to the FIFO buffer via a previous sequence of commands or under the direction of a different IOP. For example, an ISB controller or IOP may manage the compression of data and store the compressed data in a FIFO to be subsequently retrieved.

According to an embodiment, input data may include a programmed block with multiple commands and data blocks in the input payload data. The payload data may be directly stored in a target IOB and then the associated IOP will step through the commands and data stored in the IOB and execute the embedded write commands.

A third access mode may provide direct access to an IOB in buffer mode. This mode may be used to read or write the content of an IOB, such as a program, and to download data that will persist and may be processed by another IOP. In this buffer access mode, the address information may provide the address into the buffer only without reference to an ultimate destination in system memory, and the payload contains the data to be deposited in the buffer. In this instance, the payload information may be data only or may include both commands and data. For example, the buffer access mode may facilitate execution of repetitive commands that require some additional setup or storage of a sequence of commands until triggered to initiate the sequence.

A fourth access mode may provide buffer access that signals to an IOP to begin execution of a previously loaded program. For example, a received PCI instruction may include a header visible to an IOP, the header including relevant instructions for initiating a sequence of commands.

This buffer execute mode may be used when preprogrammed sequences in the IOP can be used to perform a series of tasks, and may be used to construct response packets that are written back to the host. In this access mode, if a PCI read instruction causes the IOP program execution, the read instruction will also contain a PCI read tag and a length. Therefore, the PCI response to the read instruction must contain an appropriate PCI read completion tag and must be of the proper length.

Also, in this access mode, a PCI address provided in the instruction header may represent the address of, or a pointer to, the program to execute. For example, a program may be loaded into an IOB using the buffer access mode as described above. Then, upon receipt of a PCI instruction with a pointer to the program in the address space, an associated IOP may be flagged or triggered to initiate execution of the program (e.g. by performing the instructions loaded into the IOB).

According to an embodiment, information received with the PCI header may be loaded into a register such that the update to the register flags the IOP to begin processing. Then, the program or series of steps stored in the associated IOB will begin execution. The ultimate actions performed by the IOP are determined by the pre-existing program stored in the IOB.

For write instructions received in buffer execute mode, the payload data may contain information which can be seen by the IOP. For example, an included word may be a parameter of the program.

For read instructions received in the buffer execute mode, a PCI read completion tag and length information provided with the instruction may be loaded into a register as well as the IOB address/pointer.

The execute buffer access mode may facilitate potential acceleration of a simulation cycle. For example, commands may be stored in one buffer, until triggered by the host to start the cycle of stored commands. A predetermined number of cycles may then be executed.

A fifth access mode may provide for access to registers provided by the PCI Host Interface Logic, the PCI Core, and registers used to control and debug IOPs. Using this access mode, these registers may be accessed without going through the internal system bus or otherwise accessing the internal system memory. In this access mode, a register access request will be received, and a register address will be included in the request information. Then the IOP associated with the addressed register will access the requested register.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the modules described herein need be provided or need be provided as separate units. Additionally, the methods described herein do not necessarily imply a particular order or sequence of events, nor are they intended to exclude other possibilities. Such implementation details are immaterial to the operation of the present invention unless otherwise noted above.

The exemplary methods and computer program instructions may be embodied on a non-transitory computer readable storage medium that may include any medium that can store information. Examples of a computer readable storage medium include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method for compressing data in a system emulating a circuit design, the method comprising:
receiving, from an interface, an instruction created as part of the emulation of the circuit design;
responsive to the instruction, fetching data from a memory system;
storing the fetched data in one of a plurality of buffers, wherein the one of the plurality of buffers operates in one of a FIFO mode and a buffer mode depending on die received instruction, wherein, during, the FIFO mode, (i) a first part of memory in the one of the plurality of buffers is configured to receive input and (ii) a second part of the memory in the one of the plurality of buffers is configured to produce output, and, during the buffer mode, the one of the plurality of buffers operates as a single memory architecture, wherein the first and second parts are in parallel;
compressing the stored data with a compression unit associated with the one of the plurality of buffers; and
managing, with a processor associated with the one of the plurality of buffers, parameters used during said compressing;
such that said emulating facilitates manufacture of an, integrated circuit that includes said circuit design.

2. The method of claim 1, further comprising initiating said compressing with a command from a bus controller in the system.

3. The method of claim 1, further comprising initiating said compressing with a command from one of a plurality of processors in the system.

4. The method of claim 1, further comprising identifying a target buffer from address data in the instruction.

5. The method of claim 4, further comprising storing the fetched data in the target buffer.

6. The method of claim 5, further comprising initiating said compressing with a command from a processor not associated with the target buffer.

7. The method of claim 4, further comprising storing the compressed data in the target buffer.

8. The method of claim 7, further comprising returning, with a processor associated with the target buffer, the compressed data to the interface from the target buffer in response to a read command.

9. The method of claim 1, further comprising storing fetched data in a plurality of buffers in the system and performing compression operations with a plurality of compression units in the system, each compression unit associated with a different one of the plurality of buffers.

10. The method of claim 1, wherein the one of the plurality of buffers has four ports and is configured to operate as two FIFO buffers.

11. The method of claim 10, further comprising reading, with the processor, from the one of the plurality of buffers, two words, for compression simultaneously via two of the four ports.

12. The method of claim 10, further comprising writing, with the processor, to the one of the plurality of buffers, a compression mask and compressed data simultaneously via two of the four ports.

13. An emulation system comprising:
an interface to receive an instruction created as part of emulation of a circuit design;
a memory system;
a plurality of buffers, wherein the plurality of buffers is configured to operate in one of a FIFO mode and a buffer mode depending on the received instruction, wherein, during the FIFO mode, (i) a first part of memory in one of the plurality of buffers is configured to receive input and (ii) a second part of the memory in the one of the plurality of buffers is configured to produce output, and, during the buffer mode, the one of the plurality of buffers operates as a single memory architecture, wherein the first and second parts are in parallel;
a system bus controller that fetches data responsive to the instruction from the memory system, the fetched data stored in one of the plurality of buffers;
a plurality of compression units, wherein at least one compression unit is associated with each one of the plurality of buffers, and for each buffer that receives fetched data, the associated compression unit performs compression operations; and
a plurality of processors, wherein at least one processor is associated with each buffer and the processor manages parameters for the compression operations;
such that the emulation system facilitates the circuit design for a manufacturable integrated circuit.

14. The system of claim 13, wherein a target buffer in the plurality of buffers is identified from address data in the instruction.

15. The system of claim 14, wherein the compressed data is stored in the target buffer.

16. The system of claim 15, wherein the one of the plurality of processors associated with the target buffer returns the compressed data to the interface from the target buffer in response to a read command.

17. The system of claim 13, wherein the fetched data is stored in more than one of the plurality of buffers, and respective ones of the plurality of associated compression units perform compression operations.

18. The system of claim 13, wherein the one of the plurality of buffers has four ports and is configured to operate as two FIFO buffers.

19. The system of claim 18, wherein the at least one processor reads two words for compression from the one of the plurality of buffers simultaneously via two of the four ports.

20. The system of claim 18, wherein the at least one processor writes a compression mask and compressed data to the one of the plurality of buffers simultaneously via two of the four ports.

* * * * *